July 29, 1958   J. L. OLDENKAMP ET AL   2,845,553
DYNAMOELECTRIC MACHINE
Filed Oct. 11, 1955
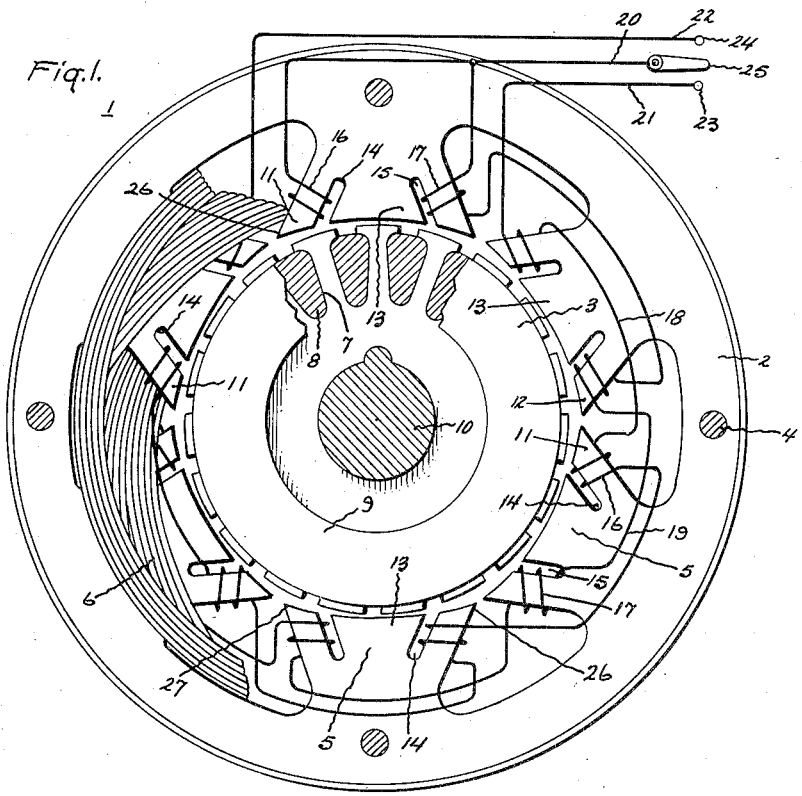
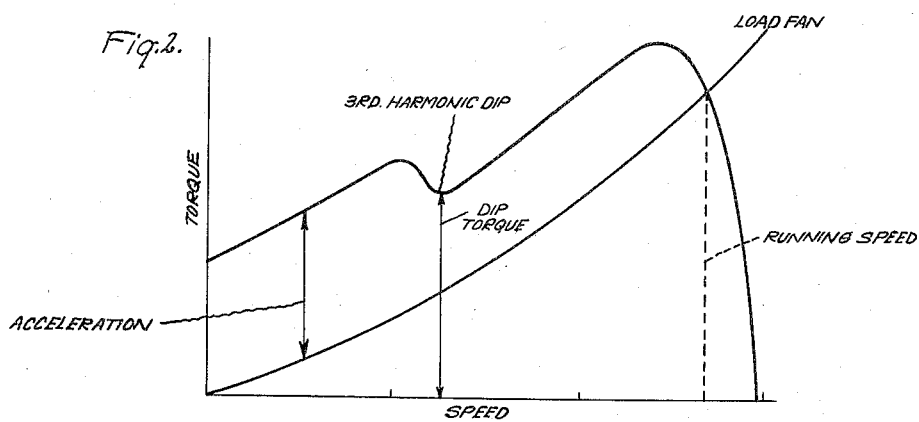
Inventors:
John L. Oldenkamp,
Fred W. Suhr,
by Robert S. Irish
Their Attorney.

United States Patent Office 2,845,553
Patented July 29, 1958

2,845,553
DYNAMOELECTRIC MACHINE

John L. Oldenkamp and Fred W. Suhr, Fort Wayne, Ind., assignors to General Electric Company, a corporation of New York Application October 11, 1955, Serial No. 539,766

1 Claim. (Cl. 310—172)

This invention relates to alternating current dynamoelectric machinery, and more particularly to reversible shaded-pole induction motors.

There are many applications, particularly in the small motor field, where shaded-pole induction motors provide great overall economy. Such motors generally include a salient pole stator with at least part of the poles each having a shading coil embracing a portion thereof to provide a flux which lags the flux in the main portion of the pole. This phenomenon tends to produce a rotating field and thereby provide a starting torque for the motor. At the same time, however, the area spanned by the shading coil will provide a lower flux than the remainder of the pole. This has the result that, in the range of a practical design, an increase in starting torque by increasing the shaded pole area must always involve a lower running efficiency. This condition necessitates a compromise between starting torque and running efficiency in the design of such motors.

In addition to the difficulties created by the compromise between efficiency and starting torque, shaded-pole motors have also had the disadvantage that a strong third harmonic field is created due to the distribution of flux in the radial air gap. This third harmonic field attains synchronous speed at one-third the synchronous speed of the motor, and a little above that speed the field will act as a generator and will have a plugging effect which considerably reduces the torque available for the load. It is, therefore, highly desirable to decrease to a great extent the dip in torque which has heretofore been caused by exceeding the synchronous speed of the third harmonic field. Where the motor load is such as a fan or blower (a common field of use for shaded-pole induction motors), the load will increase as the speed increases due to the air resistance. In such a case, a strong third harmonic dip in torque may well cause the torque available at that point to go below the load; in such a case, it is impossible for the motor to come up to any speed past the point of the third harmonic dip.

Another undesirable feature which has been most difficult to avoid in the past has been an unusual amount of noise when a load such as a fan was operated by a shaded-pole motor. It is highly desirable to eliminate the excessive noise which has heretofore been present during the starting of shaded-pole motors in connection with fan-type loads.

In those cases where only a single direction of rotation is required, the structure set forth in application Serial No. 503,192 by John L. Oldenkamp and Lewis C. Bolyard, assigned to the assignee of the present application, now abandoned, provides a desirable solution to the problem of achieving relatively high efficiency and low starting noise while decreasing the undesirable third harmonic dip compared to most previous shaded-pole structures. However, the solution arrived at in that application ceases to be available when it becomes necessary to provide a reversible shaded-pole induction motor; such reversible motors are frequently required in the same field as the motors of the aforesaid application, that is, where the motor is to drive a fan or blower so that the load increases as the speed increases due to the air resistance. For that reason, it becomes desirable to provide a structure particularly applicable to reversible shaded-pole induction motors which will provide the efficiency and low noise discussed above while decreasing the third harmonic dip also discussed above.

It is, therefore, an object of this invention to provide an improved reversible shaded-pole induction motor structure having the desirable features set forth above.

Further objects and advantages of this invention will become apparent and the invention will be better understood by reference to the following description and the accompanying drawing, and the features of novelty which characterize this invention will be pointed out with particularity in the claim annexed to and forming a part of this specification.

This invention, in one embodiment thereof, provides an alternating current reversible induction motor of the shaded-pole type having a squirrel-cage rotor with a stator surrounding the rotor and concentric therewith. The stator is divided into a plurality of equispaced salient poles which form radial air gaps with the rotor. Each of the poles has a shaded section at each end. A pair of shading coils are respectively arranged on the sections of each pole and are connected so as to be alternatively short circuited. Each pole has its face chamfered over spans of at least 30 electrical degrees to each tip thereof so as to provide a radial air gap which increases continuously over the chamfered spans as either tip of each pole is approached.

In the drawing, Figure 1 is an end view, partly cut away, of a reversible shaded-pole induction motor provided with the improved construction of this invention; and Figure 2 is a graph setting forth the torque-to-speed performance of the improved motor of this invention.

Referring now to Figure 1 of the drawing, there is illustrated a reversible shaded-pole induction motor, generally indicated at 1, having a stator 2 and a rotor 3, with the rotor being mounted concentrically and rotatably within the stator 1 by any desired means (not shown). Stator 2 is preferably formed of a plurality of thin laminations of magnetic material (only one lamination is seen in Figure 1) which may be secured together by any desired means such as rivets 4, for example. Stator 2 is formed with six salient poles 5 which are wound with a single phase running winding 6 in standard fashion. Rotor 3 is mounted on a shaft 10 and is formed of a plurality of laminations of magnetic material having openings 7 each containing a bar 8 of conductive material. The bars 8 are connected together at each end by a ring 9 of conductive material so that a plurality of closed conducting loops are provided around the surface of rotor 3.

The face of each pole 5 is divided into a pair of shaded pole sections 11 and 12 and a central section 13. Sections 11 and 12 are respectively separated from section 13 by slots 14 and 15 which accommodate respectively wound shading coils 16 and 17. All the coils 16 are interconnected, as shown at 18, and all the coils 17 are similarly connected, as shown at 19. Coils 16 and 17 are jointly connected to a line 20 at one end, coils 16 being connected to line 21 at their other end and coils 17 being connected to line 22 at their other end. Lines 21 and 22 are respectively provided with contacts 23 and 24 adapted to be selectively engaged by a contact arm 25 secured to line 20. When contact arm 25 is in engagement with contact 23, all the coils 16 will be in a short circuit; on the other hand, when contact arm 25 is placed in engagement with contact 24, all the coils 17 will be placed in short circuit.

The short circuiting of each group of shading coils will cause those coils to modify the flux within the section they encompass so that it lags the flux in section 13. This, in turn causes rotor 3 to start rotating in either a clockwise or counterclockwise direction. Such coils are well-known and may be formed in any preferred manner. In the present invention, the fact that it is necessary to disconnect one set of coils for a given direction of rotation makes a wound construction preferable.

In the present embodiment, each pole face has its face chamfered from the center of section 13 to each of the tips 26 and 27 of the pole. This provides a continuously changing air gap at the end of the pole which is opposite to the shading coil being utilized for any given direction of rotation. As is shown in Figure 1, the chamfers are such as to cause the air gap between pole 5 and rotor 3 to increase gradually from the center section 13 to each of the tips 26 and 27 of each pole 5. It will be recalled that it has been stated that the flux in a shaded section is of necessity less than that in the unshaded section of a pole. In previous constructions, the high flux of the unshaded section has been continued over to the tip of the pole. However, by the provision of the chamfering of the pole face 5 from the center of section 13 to each pole tip, with a consequent gradually increasing air gap between the pole face and the rotor 3, the flux passing across the air gap will gradually decrease from the center of section 13 to the unshaded tip of the pole. Thus, for instance, if contact arm 25 is moved into engagement with contact 23, the short circuiting of coils 16 will cause a decrease in the flux passing across the air gap between section 11 of each pole and the rotor 3. However, the chamfering of the pole tip will cause a similar decrease in flux to be observed as the other end of the pole is approached. This decrease of flux as the other tip 27 of the pole face is approached will tend to balance the decreased flux due to coils 16 which is present at the other end 26 of the pole and to eliminate to a large extent the plugging effect of the third harmonic field.

Referring to Figure 2, it will be noted that since the difference between the torque and the load on the motor at any given instance provides the acceleration for the motor, the elimination of the third harmonic dip, to the extent shown, will provide for a substantial amount of acceleration all the way up to running speed of the motor. It will be seen that where, as has previously often been the case, the third harmonic dip is permitted to become substantial, it may dip down quite close to the load curve, thereby precluding any substantial amount of acceleration at that point. If, in fact, the torque curve were to be permitted to touch or go below the load curve at that point, the motor would be unable to accelerate to its full speed and would be obliged to remain at approximately one-third synchronous speed. For this reason, the chamfering described above reduces the amount of the third harmonic dip and improves the performance of the motor by providing better distribution of the flux. Experience has further shown that the provision of the chamfer eliminates to a great extent the noise which has frequently prevailed during starting of this type of motor when connected to a load such as a fan for instance.

As explained before, the larger the section encompassed by a shading coil, the greater will be the starting torque at the expense of the running efficiency. The third harmonic dip in most previous motors was so great as to require that the shading coil be relatively large, on the order of 60 electrical degrees, to provide enough torque at the dip to get the motor up to speed. The diminution of the third harmonic dip eliminates the necessity for a large shading coil span and thus permits considerable improvement in the efficiency. Thus, by providing identical chamfers extending from section 13 to each of the tips 26 and 27 of each pole, it has been possible to improve the starting torque characteristics of the motor while also improving the efficiency, and at the same time attaining a motor with less starting noise than was previously the rule. These advantages are obtained regardless of the direction of rotation selected because of the fact that each pole is provided with two chamfers so that one chamfer will always be effective to balance the decrease in flux caused by the shading coil selected by contact arm 25.

It has further been discovered, however, that it is possible to obtain fully all the advantages set forth above only within specified dimensions. The number of electrical degrees covered by each of the shading coil sections 11 and 12 of each pole 5 should be within the range of approximately 20 to 45, with 35 being about the optimum. This range results from the provision of the chamfer opposite the shading coil; it has been found that each chamfer should extend over a span of no less than 30 electrical degrees to achieve the beneficial results of this invention.

The space between the tip 26 of one pole and the opposite tip 27 of an adjacent pole is normally limited as to a minimum by the desirability of being able to wind coil 6 by passing it between the tips of adjacent poles and by the fact that excessive leakage between poles is not desirable. The practical maximum for the space is determined by the consideration that too large a gap would waste space within the machine with a consequent lessening of the flux useful for operation of the motor. These considerations are well-known matters of design and are not deemed to constitute any part of the present invention. However, it is pointed out that where the air gap between poles is decreased below approximately 5 electrical degrees an undesirable amount of flux leakage between the poles will be observed and will detract from the motor performance. It has further been observed from experimentation that the optimum results of the invention are obtained when the chamfered parts are such that the air gap between the tips 26 and 27 of the pole and rotor 3 are approximately one and a half to three times the minimum air gap between each pole 5 and rotor 3. It has been discovered that excellent results may be obtained with a six pole machine, as shown, wherein each pole has a pair of chamfered sections as large as possible, that is, each chamfered section extends to the center of section 13, a pair of shading coil sections of approximately 35 electrical degrees each, and an interpolar space of about 15 electrical degrees. The air gap under the pole tip to be provided with the foregoing dimensions has been found to have a most desirable value of approximately twice the air gap under the center of section 13.

Such a motor was constructed to the following specifications:

| | | |
|---|---|---|
| Rated output | H. P. | ⅛ |
| Stator outer diameter | inches | 5.48 |
| Stator bore diameter | do | 3.125 |
| Rotor diameter | do | 3.10 |
| Stack length | do | 1.5 |
| Number of rotor bars | | 33 |
| Number of coil turns per stator pole (all poles connected in series) | | 74 |

With an applied voltage of 115 volts, the following performance characteristics were noted:

Clockwise:
| | |
|---|---|
| Running efficiency | 31.7 |
| Full load current | 4.88 |
| Starting torque (in percent of maximum torque) | 35.1 |
| Dip torque (in percent of maximum torque) | 53 |
| Starting noise (1 foot from 24 inch fan using appropriate weighting network) db | 56 |

Counterclockwise:
- Running efficiency _____ 32.2
- Full load current _____ 4.92
- Starting torque (in percent of maximum torque) _____ 34.0
- Dip torque (in percent of maximum torque) _ 53.6
- Starting noise (1 foot from 24 inch fan using appropriate weighting network) _____db__ 56

These performance figures indicate that the overall performance of the motor was considerably improved over that of any known reversible shaded-pole induction motor of comparable size. In addition to the other previously discussed advantages, the full load current required by the motor was found to be considerably lower than in any known previous design of reversible shaded-pole motor. This is most important where, as is frequently the case, such a motor is to be used for air moving purposes in apparatus designed to be installed in the home, since home wiring is frequently taxed to the limit of its capacities by the number of power-consuming devices presently available for use in the home. This result is attributable to the small shading coil span made possible by the motor design of this invention.

While, for illustrative purposes, a six-pole motor has been described, the invention is equally applicable to motors involving any desired number of poles and is not to be restricted to the specific embodiment shown.

Thus, while this invention has been explained by describing a particular embodiment thereof, it will be apparent that improvements and modifications may be made without departing from the scope of the invention as defined in the appended claim.

What we claim as new and desire to secure by Letters Patent of the United States is:

In a reversible induction motor of the shaded-pole type, a squirrel cage rotor, a stator surrounding said rotor and concentric therewith, said stator being divided into a plurality of equispaced salient poles which form radial air gaps with said rotor, each of said poles having a section at each end, each of said sections having a face extending over a span of approximately 35 electrical degrees, a pair of shading coils respectively arranged on said section of each pole and connected so as to be selectively short circuited, each of said poles having its face chamfered from the center of the pole to each tip thereof thereby to provide a radial air gap which increases continuously over said chamfered span as the tips of each said pole are approached, each chamfered span forming a radial air gap increasing to a maximum of approximately twice the minimum radial air gap under the center of said pole, the tips of adjacent poles being arranged to define a circumferential air gap of approximately 15 electrical degrees.

References Cited in the file of this patent

UNITED STATES PATENTS

| | | |
|---|---|---|
| 1,002,718 | Marelli | Sept. 5, 1911 |
| 1,969,981 | Janca | Aug. 14, 1934 |
| 2,066,760 | Blamberg | Jan. 5, 1937 |
| 2,773,999 | Morrill | Dec. 11, 1956 |

FOREIGN PATENTS

| | | |
|---|---|---|
| 691,620 | Great Britain | May 20, 1953 |